United States Patent [19]
Boeh

[11] Patent Number: 5,152,459
[45] Date of Patent: Oct. 6, 1992

[54] LAWNMOWER WASHER APPARATUS

[76] Inventor: Albert L. Boeh, R.R. #1, Box 184, Wathena, Kans. 66090

[21] Appl. No.: 779,055

[22] Filed: Oct. 18, 1991

[51] Int. Cl.$^5$ .............................................. B05B 15/06
[52] U.S. Cl. .............................. 239/273; 239/DIG. 6; 118/315
[58] Field of Search .................... 239/273, DIG. 6; 134/123; 118/315

[56] References Cited

U.S. PATENT DOCUMENTS

| | | | |
|---|---|---|---|
| 3,108,608 | 10/1963 | Mahowald | 239/DIG. 6 |
| 3,490,212 | 1/1970 | Hengesbach | 239/273 |
| 3,856,028 | 12/1974 | Kehler | 239/DIG. 6 |
| 4,762,278 | 8/1988 | Taylor | 239/DIG. 6 |

Primary Examiner—Andres Kashnikow
Assistant Examiner—Lesley D. Morris
Attorney, Agent, or Firm—Leon Gilden

[57] ABSTRACT

A lawnmower washer apparatus is arranged for receiving a lawnmower above a grid member, wherein the grid member is positioned above a rotary distribution head to direct water to a bottom surface of a lawnmower mounted upon the grid, and further including a torroidal manifold positioned about the rotary distribution head to direct pressurized oil to a bottom surface of the lawnmower minimizing corrosion during storage thereof.

4 Claims, 4 Drawing Sheets

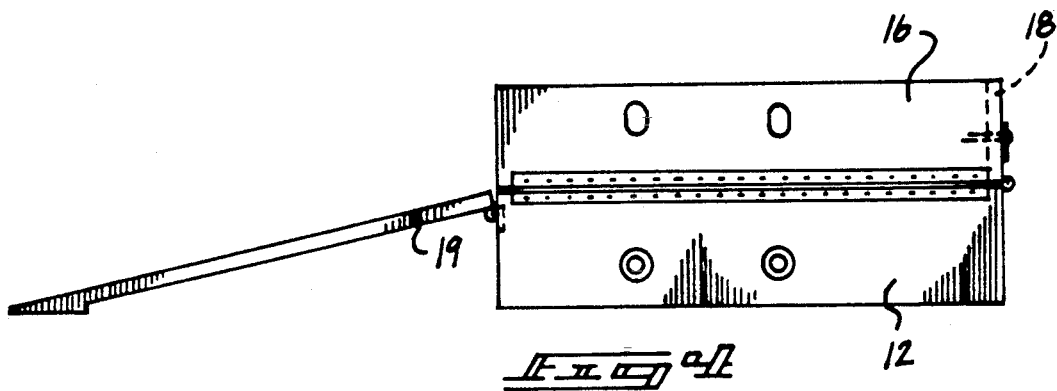
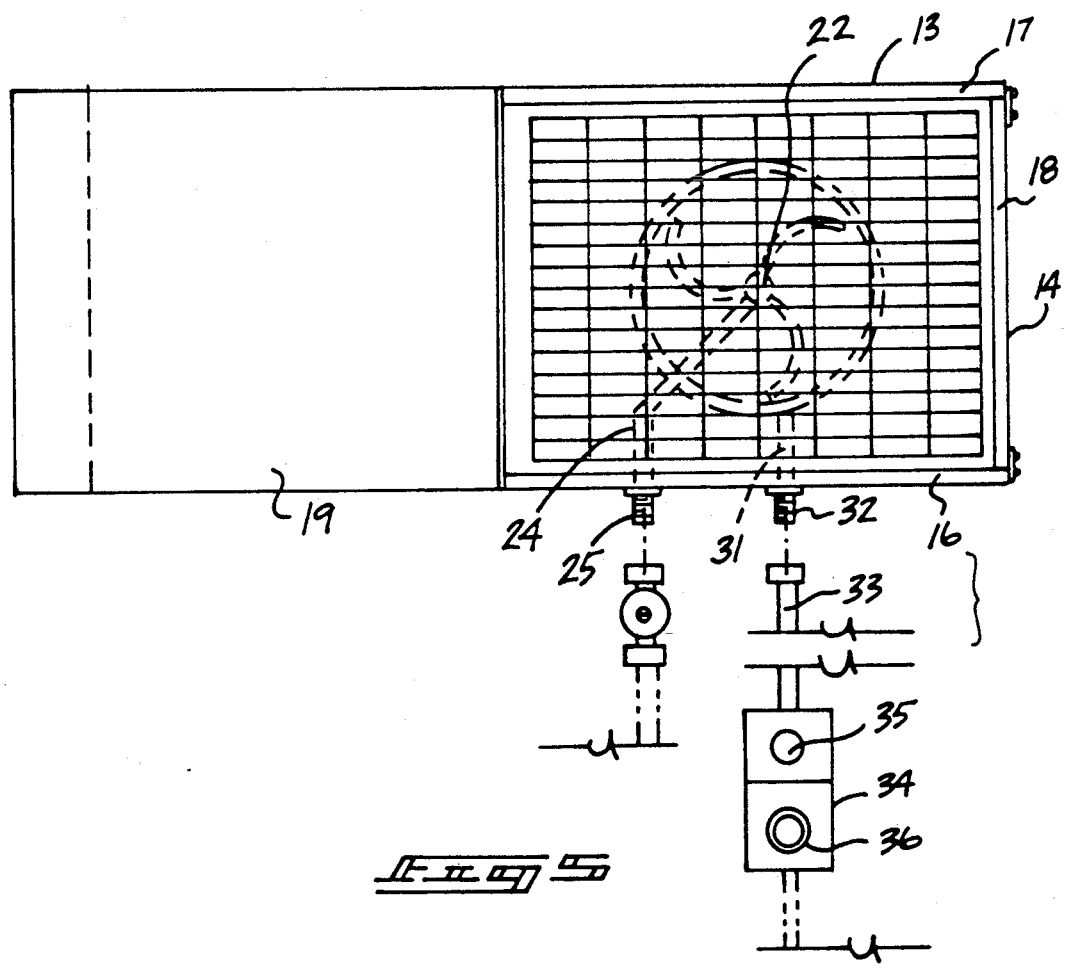

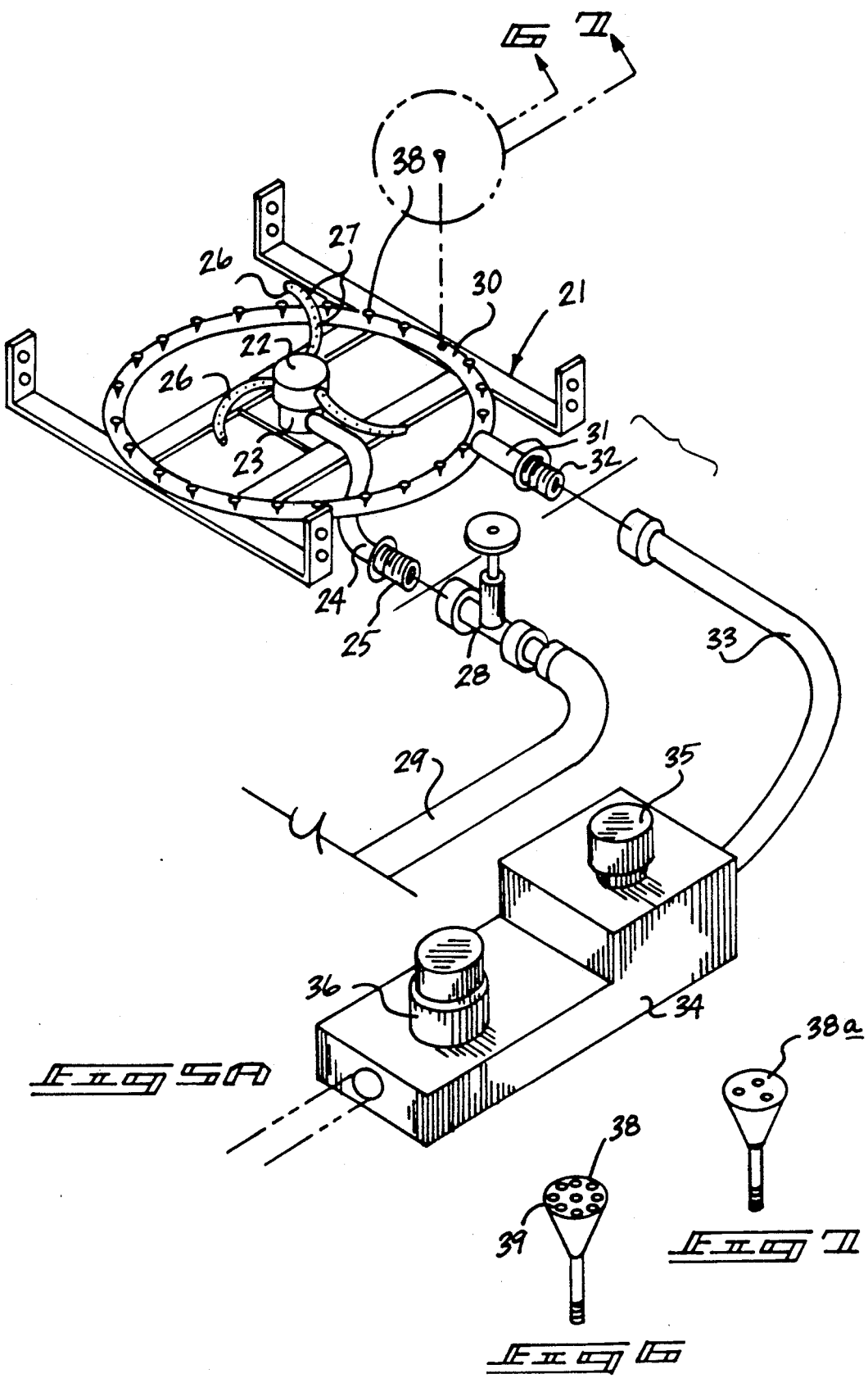

LAWNMOWER WASHER APPARATUS

BACKGROUND OF THE INVENTION

1. Field of the Invention

The field of invention relates to lawnmower apparatus, and more particularly pertains to a new and improved lawnmower washer apparatus wherein the same is arranged to accommodate a lawnmower above a container housing for the washing and rust proofing thereon.

2. Description of the Prior Art

The prior art has provided lawnmower washing apparatus as the washing of such lawnmower is typically an arduous and cumbersome procedure requiring the rotation, pivoting, and balancing of a lawnmower housing structure to permit access to a bottom surface thereof to effect its cleaning. Such apparatus is exemplified in U.S. Pat. No. 3,586,028 to Kehler wherein a plate member receives a hose and the plate member mounts a circular array of nozzles to direct a water spray upwardly into the lawnmower structure.

U.S. Pat. No. 4,762,278 to Taylor sets forth a lawnmower washing and sharpening structure for use with rotary housing lawnmower.

U.S. Pat. No. 3,490,212 to Hengesbach sets forth a rotary lawnmower cleaner attachment wherein a nozzle is directed into a discharge plate portion of a lawnmower housing to direct a fluid spray into the housing bottom surface.

As such, it may be appreciated that there continues to be a need for a new and improved lawnmower washer apparatus as set forth by the instant invention which addresses both the problems of ease of use as well as effectiveness in construction and in this respect, the Present invention substantially fulfills this need.

SUMMARY OF THE INVENTION

In view of the foregoing disadvantages inherent in the known types of lawnmower cleaning apparatus now present in the prior art, the present invention provides a lawnmower washer apparatus wherein the same is arranged to receive a lawnmower below a washer and oiling apparatus. As such, the general purpose of the present invention, which will be described subsequently in greater detail, is to provide a new and improved lawnmower washer apparatus which has all the advantages of the prior art lawnmower washing and cleaning structure and none of the disadvantages.

To attain this, the present invention provides a lawnmower washer apparatus arranged for receiving a lawnmower above a grid member, wherein the grid member is positioned above a rotary distribution head to direct water to a bottom surface of a lawnmower mounted upon the grid, and further including a torroidal manifold positioned about the rotary distribution head to direct pressurized oil to a bottom surface of the lawnmower minimizing corrosion during storage thereof.

My invention resides not in any one of these features per se. but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawnmower washer apparatus which has all the advantages of the prior art lawnmower and washer structures and none of the disadvantages.

It is another object of the present invention to provide a new and improved lawnmower washer apparatus which may be easily and efficiently manufactured and marketed.

It is a further object of the present invention to provide a new and improved lawnmower washer apparatus which is of a durable and reliable construction.

An even further object of the present invention is to provide a new and improved lawnmower washer apparatus which is susceptible of a low cost of manufacture with regard to both materials and labor, and which accordingly is then susceptible of low prices of sale to the consuming public, thereby making such lawnmower washer apparatus economically available to the buying public.

Still yet another object of the present invention is to provide a new and improved lawnmower washer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments ot the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic view, taken along the lines 4—4 of FIG. 3 in the direction indicated by the arrows.

FIG. 5 is an orthographic view, taken along the lines 5—5 of FIG. 3 in the direction indicated by the arrows.

FIG. 5a is an isometric illustration in exploded view of the various oiling and washing components positioned within the housing structure.

FIG. 6 is an isometric illustration of a nozzle as set forth in section 6 of FIG. 5a.

FIG. 7 is an isometric illustration of a further example of a nozzle structure of a type as exemplified in section 7 of FIG. 5a.

DESCRIPTION OF THE PREFERRED EMBODIMENT

Figure 1:
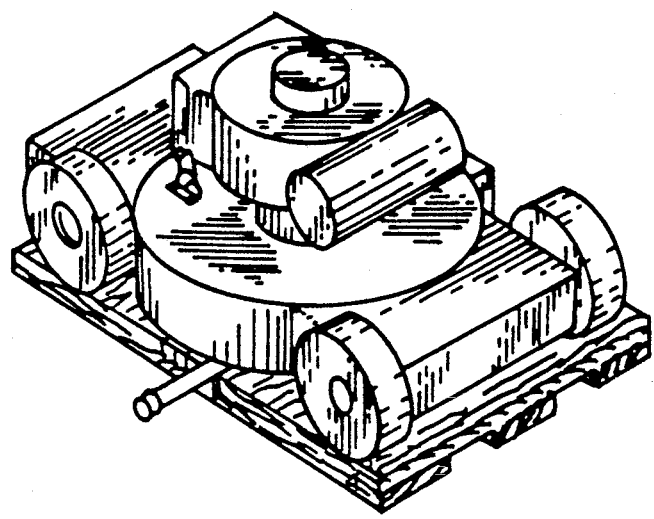
FIG. 1 is an isometric illustration of a prior art lawnmower washer apparatus.
Figure 2:
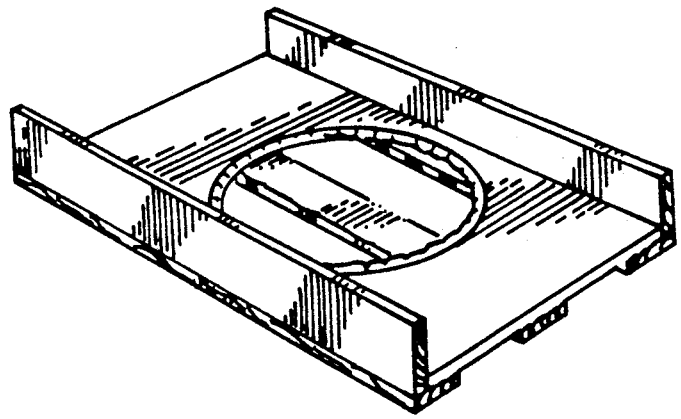
FIG. 2 is a prior art example of a further lawnmower washer apparatus.

With reference now to the drawings, and in particular to FIGS. 1 to 7 thereof, a new and improved lawnmower washer apparatus embodying the principles and concepts of the present invention and generally designated by the reference numeral 10 will be described.

FIG. 1 sets forth a prior art lawnmower washer structure as set forth in U.S. Pat. No. 3,856,028, wherein a lawnmower is mounted upon platform, wherein the platform receives a fluid conduit for directing fluid into an annular spray arrangement to direct water onto a bottom surface of the lawnmower structure. The FIG. 2 sets forth a further embodiment of the U.S. Pat. No. 3,856,028 forming a trough-like structure to receive a lawnmower and position a lawnmower above a circular array of nozzles.

More specifically, the lawnmower washer apparatus 10 of the instant invention essentially comprises a container housing 11, including a first side wall 12 spaced from a second side wall 13, with a first end wall 14 spaced from a second end wall 15. The walls are in turn fixedly mounted to a floor of the organization. The walls also are of an equal predetermined height, as illustrated. A first splash plate 16 is mounted coextensively to an upper terminal end of the first side wall 12, with a second splash plate 17 mounted coextensively to an upper terminal end of the second side wall 13. A third splash plate 18 extends upwardly relative to the first end wall 14. A ramp plate 19 extends from the upper terminal end of the second end wall 15 accommodating a lawnmower to traverse the ramp plate 19 and be received upon a grid plate 20 arranged in a parallel relationship relative to the floor of the container housing 11. The grid plate, as illustrated, is defined by a matrix of openings that are coextensively directed between the upper terminal ends of the associated walls 12-15. Reference to FIGS. 5 and 5a illustrate the use of a support frame 21 that is fixedly mounted between the side walls 12 and 13 positioning a distribution head 22 orthogonally and medially of the floor of the container housing, wherein the distribution head 22 is rotatably mounted about a head support boss 23 that receives a fluid first conduit 24 in fluid communication with the head support boss 23 to direct fluid, particularly water, through the distribution head 22 into a plurality of radially outwardly directed arcuate spray legs 26, each including a series of spray leg apertures 27 projecting upwardly of each spray leg 26 to direct water to a bottom surface of a typical lawnmower housing, such as illustrated in FIG. 1, mounted upon the grid plate 20. The fluid or first conduit 24 terminates in a connection boss 25 that is fixedly mounted to the first side wall 12 and projecting therethrough that in turn receives a fluid valve 28 to effect selective flow of fluid into the first conduit 24. A pressure water hose 29 in turn is connected to the fluid valve 28 from any desirable source of pressurized water.

A torroidal manifold ring 30 is positioned about the distribution head 22 and support boss 23 that are coaxially aligned within the manifold ring 30, and wherein the manifold ring further is positioned exteriorly of the spray legs 26. An oil hose 31 mounted in fluid communication with the manifold ring defines a second conduit terminating in second conduit connecting boss 32 directed through the first side wall 12. An oil hose 33 is directed from the second conduit connecting boss 32 into a reservoir block 34. The reservoir block 34 includes a fill conduit 35, as well as an oil release valve and button member assembly 36, directing pressurized air from an associated pressure source 37 such as an air compressor, pneumatic canister, and the like, into the reservoir block 34 thereafter directing the pressurized oil through the second conduit 31 and thereafter directing oil through the associated conical spray heads 38, such as illustrated in FIGS. 6 and 7. The conical spray heads 38 are inverted and may be of a type 38 or 38a, such as illustrated in FIGS. 6 and 7, providing for a predetermined number of outlet ports as desired. The outlet ports are directed through a planar top surface 39 that is orthogonally oriented relative to the axis of the distribution head 22 to project an oil spray upwardly to the bottom surface of an associated lawnmower housing to inhibit corrosion and prolong use of the lawnmower and associated blade structure.

Figure 3:
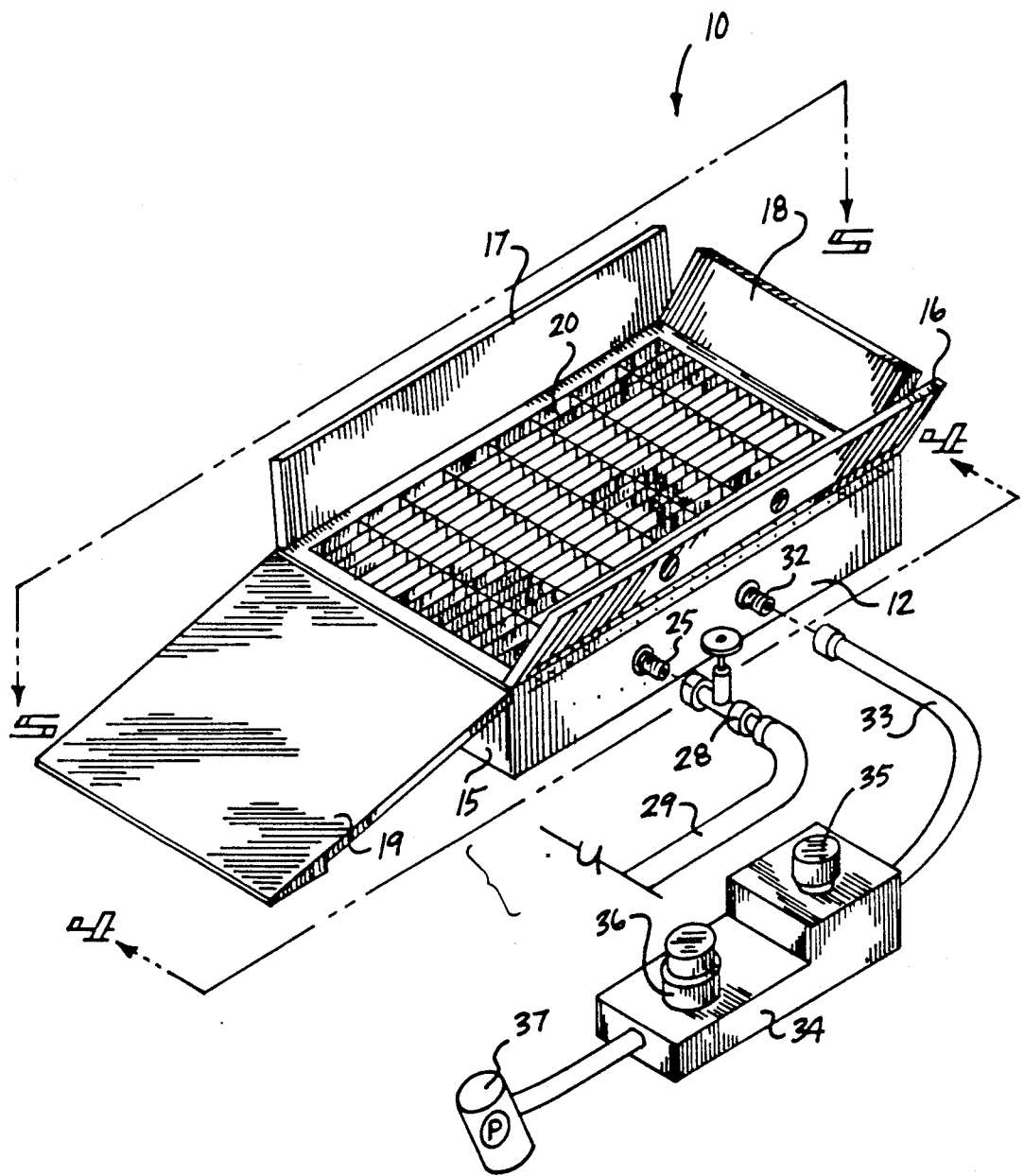
FIG. 3 is an isometric illustration of the instant invention.

It should be further noted, such as illustrated in the FIG. 3, as exemplified by the first splash plate 16, a hinge interconnection is provided relative to each splash plate and each respective wall to permit each splash plate to be overfolded relative to the lawnmower housing to assist in deflecting water and associated oil spray into the housing and minimizing spray exteriorly of the housing structure. Further, it should be noted that the first splash plate 16 includes a plurality of bores that are spaced apart a predetermined spacing to receive the respective first conduit connecting boss 25 and the second conduit connecting boss 32 therethrough to permit overfolding of the first splash plate if desired relative to the side wall prior to connection of the water hose 29 and the oil hose 33 thereto.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A lawnmower washer apparatus, comprising,
a container housing, the container housing including a first side wall spaced from a second side wall, and a first end wall spaced from a second end wall, and a floor, each wall defined by a predetermined height, and
a first splash plate mounted coextensively and hingedly to an upper terminal end of the first side wall, a second splash plate mounted coextensively and hingedly to an upper terminal end of the second side wall, and a third splash plate coextensively and hingedly connected to an upper terminal end of the first end wall, and
a ramp plate mounted to an upper terminal end of the second end wall extending exteriorly and canted downwardly relative thereto, and
a grid plate defined by a matrix of openings, wherein the grid plate is coextensively contained within the container housing parallel to the floor and spaced therefrom, and
a fluid distribution means mounted to the floor below the grid plate for directing fluid to a bottom surface of a lawnmower housing.

2. An apparatus as set forth in claim 1 wherein the fluid distribution means includes a support frame, the support frame is mounted orthogonally between the first side wall and the second side wall and includes a head support boss orthogonally and medially mounted relative to the floor, and the head support boss including a distribution head rotatably mounted to the head support boss coaxially aligned therewith, and the distribution head includes a plurality of arcuate spray legs projecting radially and exteriorly of the distribution head, wherein each spray leg of said spray legs includes a plurality of spray leg apertures projecting upwardly relative to the grid plate, and the head support boss including a first conduit in fluid communication with the head support boss, the first conduit including a first conduit connecting boss fixedly mounted and directed through the first side wall, and a fluid valve mounted to the first conduit connecting boss, and a pressurized water hose in fluid communication with the first conduit through the fluid valve.

3. An apparatus as set forth in claim 2 including a torroidal manifold ring positioned in surrounding relationship relative to the head support boss and the spray legs, wherein the head support boss is coaxially aligned relative to the manifold ring, and the manifold ring includes a second conduit directed into the manifold ring in fluid communication therewith, the second conduit including a second conduit boss fixedly mounted through the first side wall, and an oil hose in fluid communication to the second conduit connecting boss, and a reservoir block in fluid communication with the oil hose, and the reservoir block including a fill conduit, and the reservoir block further including an oil release valve, and a pressure source means for directing pressurized air into the reservoir block for pressurizing the reservoir block, whereupon opening of the oil release valve directs oil from the reservoir block into the oil hose and the torroidal manifold ring.

4. An apparatus as set forth in claim 3 wherein the manifold ring includes a series of spaced spray heads mounted to the manifold ring projecting upwardly thereof, wherein each spray head includes a planar top surface, the planar top surface arranged parallel relative to the grid plate, and the planar top surface including a plurality of fluid ports to direct oil flow through the ports into a lawnmower housing.

* * * * *